No. 865,245.

PATENTED SEPT. 3, 1907.

F. E. HARDEN.
JOURNAL BEARING.
APPLICATION FILED MAR. 30, 1907.

WITNESSES

INVENTOR
FREDERICK E. HARDEN.
BY
ATTORNEYS

UNITED STATES PATENT OFFICE.

FREDERICK EUGENE HARDEN, OF ATLANTA, GEORGIA.

JOURNAL-BEARING.

No. 865,245.      Specification of Letters Patent.      Patented Sept. 3, 1907.

Application filed March 30, 1907. Serial No. 365,464.

*To all whom it may concern:*

Be it known that I, FREDERICK EUGENE HARDEN, a citizen of the United States, and residing at Atlanta, in the county of Fulton and State of Georgia, have invented a new and useful Improvement in Journal-Bearings, of which the following is a specification.

This invention relates particularly to bearings for the journals or spindles of the wheels of trains used in meters and the like, wherein accuracy is desirable and the opportunity for inspection, adjustment or repair is not convenient.

The object of the invention is to provide a self centering and adjusting bearing of simple construction and long life, which will not at any time allow the spindle to wabble or get out of proper position with respect to the other parts of the train, and which will, furthermore, permit of quick and easy repair when the bearing becomes entirely worn out.

The invention is applicable to the bearings of vertical arbors or spindles, and is designed especially for the arbors carrying the gears in water meters, wherein an adjustment by hand would necessitate cutting off the water and opening the meter casing, and where, consequently, it is desirable to make the train run as long as possible without interference or interruption. In the present invention the adjustment is automatic, as wear is taken up as fast as it occurs.

The invention is illustrated in the accompanying drawings, in which

Figure 1:
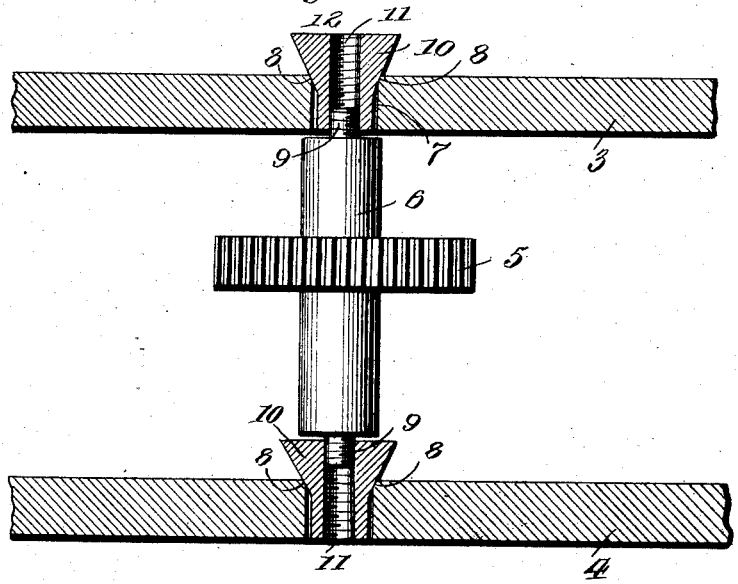
Figure 2:
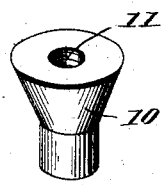

Figure 1 is a vertical section of the bearing, as applied to an arbor in a train. Fig. 2 is a perspective view of one of the bearing sleeves or cones, removed.

Referring specifically to the drawings, 3 and 4 indicate the opposite plates of the train or movement, and 5 is one of the gears, mounted on an arbor 6. The plates have the journal holes or sockets 7 the rims of which, on the upper side are slightly countersunk or beveled as indicated at 8. The ends of the arbors are reduced and threaded as at 9, to receive the conical or tapered bearing sleeves or bushings 10 which are bored and threaded axially as at 11 to screw upon the ends 9. The sleeves 10 are preferably made cylindrical for a portion of their length and conical for the remainder, the cylindrical part being of less diameter than the holes 8 so as to fit without contact therein. The bearing contact is between the conical part and the beveled surface 8 of the plates, and, obviously, when the arbor is set between the plates the cones are screwed on to proper adjustment of the bearing surfaces.

Since the bearings are applied to vertical arbors, the cones are both applied with the large end up, to rest upon the plates, and are held in position by the weight of the rotating parts. As the bearing wears, the cones follow down into the holes or cups, and will consequently last, and preserve the proper center, until they are entirely worn out. Then, new cones may be quickly substituted by unscrewing the old ones. The arbor will not at any time wabble or get out of alinement. The axial movement or drop will not affect the engagement of the gears, since they may be made wide enough to remain in mesh as long as the cone lasts. If the plates wear through at the holes, larger cones may be substituted. The threads of the screws are cut in a direction opposite to the direction of rotation of the spindle, so that the friction of the cones against the bearing plates tends to tighten the cones.

The invention is not limited to the bearings of gear trains, but may be applied as a stop bearing, or to any vertical spindle or shaft to which it is appropriate. No hand adjustment is necessary after the cones are once set. All lost motion due to shafts or arbors being off center is prevented, as the bearing is continually self centering and adjusting, insuring an accuracy of result particularly desirable in meters and the like. It will be seen that there is no wear on the arbor, and the bearings can be renewed or used a number of times, at much less expense than if new arbors were necessary.

I claim

1. The combination with upper and lower plates having tapered bearing sockets in the upper sides thereof, of a vertical spindle between the plates, and tapered sleeves screwed on opposite ends of the spindle, with their large ends above, and fitting in the sockets.

2. The combination with upper and lower plates provided with openings, of a vertical spindle between the plates, and tapered sleeves screwed on opposite ends of the spindle with their large ends above and fitting in the openings.

FREDERICK EUGENE HARDEN.

Witnesses:
     JOSEPH ALLEN,
     R. B. SIMMS.